2,985,611
Patented May 23, 1961

2,985,611

INTERPOLYMERS CONTAINING THE NORBORNENE NUCLEUS AND COATING COMPOSITIONS CONTAINING SAME

Norman G. Gaylord, Westbury, N.Y., and Russell T. Dean, Stamford, Conn., assignors to Interchemical Corporation, New York, N.Y., a corporation of Ohio No Drawing. Filed Oct. 22, 1958, Ser. No. 768,839

19 Claims. (Cl. 260—30.8)

This invention relates to relatively low-molecular weight, organic solvent soluble acrylic polymers compatible with amine-aldehyde resins and reactive therewith under heat-curing conditions to yield extremely durable surface coatings which exhibit excellent resistance to scratching, staining, washing, and weathering.

For a number of years it has been known that extremely hard thermosetting resins that are stain and scratch resistant can be made by reaction of an aldehyde (preferably formaldehyde) with a polyfunctional amide, such as urea, biuret, dicyandiamide, and (especially) triazines such as ammeline, melamine, substituted melamines, benzoguanamine etc. The resulting resins may be prepared in aqueous solutions or in lower alcohols, in which case they are hydrophilic, or they may be produced in the presence of higher alcohols, such as butyl, in which case they are hydrophobic and may be used as a solution in a mixture of higher alcohol (e.g., butyl or higher) and aromatic hydrocarbon (e.g., xylene or toluene). These resins are available commercially under trade-names such as Uformite, Resimene, Aerotex, Melmac, etc.

These "amine-aldehyde" resins have proven very valuable in a number of applications. Used by themselves they are excellent for certain molding uses, but without extensive modification they are unsatisfactory for most surface coating applications due to their poor adhesion to many metal surfaces and to their very slight flexibility. This is unfortunate because their low cost, extraordinary hardness and good alkali and detergent resistance all represent properties much sought after for many surface coating applications.

It has been proposed to combine amine-aldehyde resins with alkyd resins of various kinds to combine the flexibility and surface adhesion characteristics of the alkyds with the hardness and detergent-resistance of the amine-aldehyde resins. Such efforts, indeed, have been successful to a very large degree, and very excellent surface coatings have been prepared on this basis. However, even the best products produced by this means have remained somewhat deficient in resistance to alkalies and detergents, so that they have not been altogether satisfactory for finishes to be applied to home laundry and dish-washing appliances, for example.

Acrylic resins are inherently more resistant to alkalies than are alkyds, and it has been proposed to combine organic solvent soluble acrylic resins with amine aldehyde resins in order to produce surface-coating compositions. At least three major difficulties have attended these efforts. First, the acrylic resins are normally incompatible with cured amine-aldehyde resins so that non-homogeneous films lacking in cohesiveness have often been obtained. Secondly, even when compatibility with the amine-aldehyde resins was achieved by special monomer formulations of the acrylic resins, the adhesion to metal substrates and the resistance to many solvents was often unsatisfactory. And third, the control of acrylic solution polymerization to yield concentrated solutions of polymers having suitable viscosity without undue sacrifice of their desirable properties has been difficult; it has in most cases been necessary to work at relatively very low concentrations so that the acrylic polymer solutions were too dilute for wide use in preparing surface-coating compositions.

We have now discovered a new class of acrylic polymers, more fully defined below, which have excellent pigment wetting and dispersing properties, are compatible with a number of different surface-coating resins, can be prepared in relatively concentrated solutions, and are of great utility in the compounding of finished surface coatings of the heat-curing type.

Certain of these new acrylic polymers may be combined with thermosetting amine-aldehyde resins to yield heat-curable surface coatings which adhere well to metal surfaces, are tough and homogeneous, are hard and scratch resistant, exhibit excellent resistance to the attack of alkalies, soaps, and detergents, are flexible, and remarkably stable to discoloration, even when subjected to heating at considerably higher temperatures or for longer periods than is needed for full care.

These new acrylic polymers are made by bulk or solution polymerization of a mixture of (1) a minor proportion of a non-allylic alcohol containing the norbornene nucleus, (2) a major proportion of an ester or a mixture of esters selected from the group consisting of the alkyl esters of acrylic and methacrylic acid in which the alkyl groups contain from one to eight carbon atoms. The non-allylic alcohol containing the norbornene nucleus will ordinarily constitute about 5–30% of the copolymerization mixture, and the $C_1$–$C_8$ alkyl esters of acrylic and/or methacrylic acids will usually constitute from about 50% to about 95% of the copolymerization mixture. Preferably, there will also be present in the copolymerization mixture certain modifiers in amount about 2–35%. Among such modifiers which improve the properties of the copolymers may be mentioned: acids, such as acrylic and methacrylic; nitriles, such as acrylonitrile and methacrylonitrile; vinyl esters, such as vinyl acetate, vinyl propionate and vinyl stearate; esters of unsaturated dibasic acids, such as dimethyl maleate and dibutyl fumarate; styrene, alpha-methyl styrene, and the various vinyl toluenes; amides, such as acrylamide, methacrylamide, methylolacrylamide, and methylol-methacrylamide; hydroxy compounds such as ethylene glycol monoacrylate or monomethacrylate, glycerol monoacrylate or monomethacrylate or glycerol allyl ether; and vinyl alkyl ethers such as vinyl butyl ether, vinyl ethyl ether, vinyl hexyl ether, etc.

Norbornene has the formula

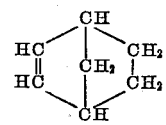

and may be conveniently represented by the symbolic formula

Non-allylic alcohols containing the norbornene nucleus suitable for use in the practice of this invention include 2-hydroxymethyl-5-norbornene

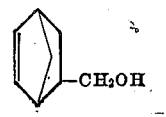

x-Methyl-2-hydroxymethyl-5-norbornene

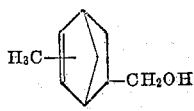

2,2-bis-(hydroxymethyl)-5-norbornene

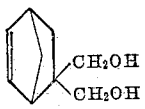

2-methyl-2-hydroxymethyl-5-norbornene

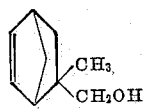

x-Methyl-2,2-bis-(hydroxymethyl)-5-norbornene

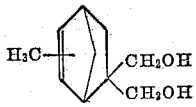

2,3-bis-(hydroxymethyl)-5-norbornene

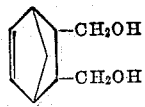

x-Methyl-2,3-bis-(hydroxymethyl)-5-norbornene

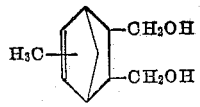

2-hydroxy-5-norbornene

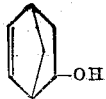

and x-methyl-2-hydroxy-5-norbornene.

These non-allylic alcohols containing the norbornene nucleus may all be made by means of known and relatively simple Diels-Alder condensations. The preparation of these Diels-Alder condensation products constitutes no part of the instant invention, but will be here outlined very briefly so that those versed in the art of chemical sythesis can readily have the desired materials available for the practice of this invention. 2-hydroxymethyl-5-norbornene may be prepared, following the disclosures of U.S. Patents 2,596,279 and 2,352,606 by heating cyclopentadiene with allyl alcohol, which causes the following reaction to occur:

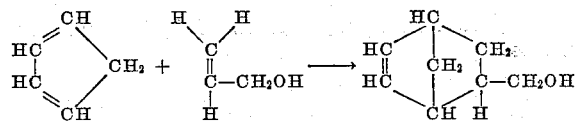

If methylcyclopentadiene is employed instead of cyclopentadiene, then one obtains x-methyl-2-hydroxymethyl-5-norbornene, the x- indicating uncertainty as to the exact position occupied by the methyl group on the 5-atom ring derived from the methylcyclopentadiene starting material.

2-methyl-2-hydroxymethyl-5-norbornene may be prepared conveniently by a Diels-Alder condensation of cyclopentadiene with methallyl alcohol. If methylcyclopentadiene is employed, a 2,x-dimethyl-2-hydroxymethyl-5-norbornene is formed.

The 2,3-bis-(hydroxymethyl)-5-norbornenes may be prepared similarly by reaction of butene-1,4-diol with cyclopentadiene or methylcyclopentadiene.

The 2,2-bis-(hydroxymethyl)-5-norbornene can be prepared by condensing cyclopentadiene with acrolein to yield a 5-norbornene-2-carboxaldehyde. By treatment of this aldehyde with two mols of aqueous formaldehyde in the presence of sodium hydroxide, there results an aldolization and cross-Cannizzaro reaction by which there is formed sodium formate and 2,2-bis-(hydroxymethyl)-5-norbornene.

The 2-hydroxy-5-norbornene is most easily prepared by reaction of cyclopentadiene with vinyl acetate to yield 2-acetoxy-5-norbornene, followed by saponification to yield the cyclic alcohol. Similarly, by use of methylcyclopentadiene, one can obtain an x-methyl-2-hydroxy-5-norbornene product.

Among the above non-allylic alcohols containing the norbornene nucleus, the primary alcohols are preferred, with the 2-hydroxymethyl-5-norbornene the most preferred.

The above non-allylic alcohols containing the norbornene nucleus do not homopolymerize under ordinary conditions. However, we have found that if these non-allylic alcohols containing the norbornene nucleus are mixed with certain acrylic and other monomers, heated to about 70°–140° C., and treated with free-radical polymerization initiators, co-polymerization occurs readily. The reaction is somewhat exothermic, and it is usually desirable to control it by use of diluent solvents and by gradual addition of part of the reactants and all the reaction initiator to a well stirred solution of the rest of the reactants.

The copolymerization of a non-allylic alcohol containing the norbornene nucleus with an acrylic-type ester and (preferably) other mono-olefinically unsaturated monomers is preferably conducted in solution, and is initiated by "catalysts" or polymerization initiators of the free radical type. The most commonly used initiators are azo compounds and organic peroxygen compounds. Typical of the azo compounds that may be used for this purpose are azobisisobutyronitrile and azobisisovaleronitrile. Typical of the organic peroxygen compounds that may advantageously be used as copolymerization initiators are such compounds as peracetic acid, acetyl peroxide, perbenzoic acid, benzoyl peroxide, lauroyl peroxide, stearoyl peroxide, ditertiary butyl peroxide, tertiary butyl hydroperoxide, methyl ethyl ketone-hydrogen peroxide adduct, and cyclohexanone-hydrogen peroxide adduct.

The non-allylic alcohols containing the norbornene nucleus tend to be somewhat less reactive under copolymerization conditions than typical acrylic monomers, such as acrylic acid, methacrylic acid, their alkyl esters, etc. Accordingly, if they are mixed initially with all of the other polymerizable monomers with which they are to be copolymerized, the tendency is for the most reactive monomers to polymerize or copolymerize by themselves at first, with the norbornene alcohol remaining essentially unreacted until the supply of more reactive molecules is substantially exhausted. Such conditions do not favor efficient and uniform incorporation of these less-reactive monomers into a copolymer. We have found that efficient and relatively uniform incorporation of norbornene alcohols into acrylate copolymers occurs when the acrylate and other highly reactive monomers are added slowly (with a catalyst or reaction initiator) to the norbornene alcohol. Accordingly most of the examples which follow will illustrate this technique.

While we prefer to carry out the copolymerization step in solution, we can in some cases advantageously proceed in the absence of any solvent. Because dilution with a solvent permits better agitation and temperature control, we prefer to use a solvent. When the resin is to be used in solution, as in the formulation of surface coating compositions, it is preferable to prepare it in the solvent in which it is to be used. The concentration at which the copolymer is prepared does not ordinarily appear to be very critical, though it will have some influence, it appears, on the molecular weight of the copolymer; increasing the concentration of monomers in a reaction zone favors the production of higher molecular weight polymers, and dilution favors lower molecular weights. We ordinarily prefer to work at about 50 to 75%. As solvents we prefer to employ benzene, xylene, ethyl benzene, or toluene, but aromatic petroleum naphthas may also be used. Other solvents that may be used include the lower aliphatic alcohols, ketones, ethers, and sulfoxides.

The exact chemical nature of the copolymerization reaction is not fully understood. The non-allylic alcohols containing the norbornene nucleus apparently behave predominantly as vinyl monomers and enter into the linear, predominantly acrylic, chains in more or less random manner, their frequency of appearance in the chains being in some manner dependent on their relative concentration in the copolymerization mixture. But they also act as controllers of the polymerization reaction in the sense that they appear to terminate chain growth and thus prevent formation of very high-molecular weight materials. In thus acting as chain-terminators, the non-allylic norbornene alcohols may react in such a way that their hydroxyl group becomes masked; determination of the hydroxyl value of a copolymer based in part on these non-allylic norbornene alcohols often gives results lower than theoretical, and we believe that this deviation from theoretical can be taken as a rough indication of the degree to which the alcohol group of the non-allylic norbornene alcohols have served as chain terminators.

We believe, further, that the unusual properties of our new copolymers are due in part to the presence of the unmasked, pendant hydroxyl groups which remain in the copolymer. We further believe that the copolymers prepared from the preferred 2-hydroxymethyl-5-norbornene contain the desirable primary hydroxyl group which is especially reactive with amine aldehyde resins, including urea-formaldehyde resins, melamine-formaldehyde resins, benzoguanamine-formaldehyde resins, etc., producing extremely hard, resistant surface coatings.

As pointed out above, these new copolymers show excellent compatibility with thermosetting amine-aldehyde resins, which fact makes them extremely valuable in the formulation of surface coatings such as appliance enamels, metal decorating inks, and other uses. Another remarkable and valuable property of these resins is an unusual pigment-wetting power, which makes easy the dispersion of pigments such as carbon black, titanium oxide, phthalocyanines, etc., in vehicles containing these copolymers.

The novel organic solvent soluble copolymers of this invention ordinarily have molecular weights between about 500 and 3000, with the range between about 1500 and about 2000 preferred for formulation of surface coatings. It has been observed that when methyl methacrylate or methacrylic acid are employed in making the copolymers of this invention the molecular weights of the resulting copolymers tend to be lower than is the case when these particular monomers are not used.

The following examples will serve to illustrate the practice of this invention.

*Example 1*

A solution of 161 grams (1.26 mols) of butyl acrylate and 4 grams (0.024 mol) of azobisisobutyronitrile catalyst in 100 grams of xylene is added dropwise over a period of three hours to a solution of 39 grams (0.31 mol) of 2-hydroxymethyl-5-norbornene in 100 grams of xylene maintained at 90° C. The mixture is stirred continuously during the addition and for an additional 18 hours at 90° C. A solids determination (by heating a sample at 150° C. for 30 minutes at atmospheric pressure and then for another 30 minutes at an absolute pressure of 2 mm. mercury) indicates a 91% conversion of monomers to copolymer. After adding another gram of azobisisobutyronitrile and heating for another 5 hours, the conversion is 98%. An ebulliometric molecular weight determination (in benzene) gives a value of 2677 for the copolymer resin. Based on conversion, the copolymer resin contains a minimum of about 18% 2-hydroxymethyl-5-norbornene. Analysis for hydroxyl content shows that at least 14.1% of 2-hydroxymethyl-5-norbornene is contained in the copolymer resin. Tough, adherent films are formed when a solution of the resin is applied to metals and dried. The resin is compatible with hydrophobic amine-formaldehyde resins, and when blended in solution with a butylated triazine formaldehyde resin (Uformite MX–61) in a weight ratio (solids basis) of six parts of copolymer resin to 4 parts of triazine resin, the resulting clear lacquer yields tough flexible cured films when baked at 350° F. for 30 minutes. These baked films have a high gloss and exhibit excellent resistance to soap, solvents, and detergents. If desired, the lacquer solutions may be pigmented by admixing with standard enamel pigments.

*Example 2*

A solution of 169 grams (1.97 mols) of methyl acrylate and 4 grams of azobisisobutyronitrile in 100 grams of toluene is added dropwise over a 2 hour period to a stirred solution of 31 grams (0.25 mol) of 2-hydroxymethyl-5-norbornene in 100 grams of toluene maintained at a temperature of 80° C. Heating and stirring are continued at 80° C. for 17 hours, after which a solids determination shows about 49% solids, indicating a monomer conversion of about 98%. The solid resin has a molecular weight in benzene of about 2010. Hydroxyl analysis indicates that approximately half the OH's have become masked.

The resin solution is blended with Uformite MX–61 solution at a solids ratio of 6:4, and the resulting blend is drawn down on a steel panel and baked at 350° F. for 30 minutes. The resulting film shows a good cure, but it is rather brittle, and adhesion to the metal is poor.

*Example 3*

A solution of 115 grams ethyl acrylate and 3 g. benzoyl peroxide in 75 g. xylene is added over a three hour period to 35 g. 2-hydroxymethyl-5-norbornene and 75 g. xylene heated to 70° C., after which heating is continued for another 17 hours at 70° C. The solution now contains about 41% solids. Another 0.75 g. benzoyl peroxide is added, and the mixture is kept at 70° C. for 5 hours more. The solids content is now about 43%, indicating a monomer conversion of about 86%.

A portion of this resin solution is blended at a 6:4 (solids) ratio with Uformite MX–61 (a butylated triazineformaldehyde resin, marketed by Rohm & Haas Co., Philadelphia, Pennsylvania). Steel panels are coated with this blend and then baked for 30 minutes at 177° C. The baked film is homogenous and well cured, flexible, and with moderately good resistance to solvent attack and staining.

*Example 4*

A solution of 115 g. ethyl acrylate, 7.5 g. methacrylic acid, and 3 g. azobisisobutyronitrile in 75 g. xylene is added over 3 hours to 35 parts of 2-hydroxymethyl-5-norbornene in 75 parts of xylene at 90° C. Heating is continued overnight (17 hours more). Solids content is then 45%. A further 0.75 part of azobisisobutyronitrile is added and the mixture is stirred and heated another five hours at 90° C. Final solids content is 45%.

The solution of this polymer is blended with Uformite MX–61 (a butylated triazine-formaldehyde resin) at a 6:4 ratio, solids basis, and is found to give a compatible film. This blend is spread over a steel panel and baked 30 minutes at 177° C.; curing is good. The baked film is slightly brittle with crazing when bent.

This copolymer is also compatible with Resimene-875 (a butylated melamine-formaldehyde resin marketed by Monsanto Chemical Co.) when blended at 6:4, 7:3, and 8:2 (solids) ratios. All three blends give baked films which are hard and well-cured. The baked film from the 6:4 blend is very hard and brittle; that from the 7:3 blend is hard and somewhat brittle, while the film from the 8:2 blend is flexible. All three show good resistance to staining and solvent attack.

*Example 5*

A solution of 120.8 g. butyl acrylate, 7.5 g. methacrylic acid, 7.5 g. acrylonitrile, and 3 g. azobisisobutyronitrile, in 75 g. xylene is added over a period of three hours to 29.2 g. 2-hydroxymethyl-5-norbornene in 75 g. xylene heated to 90° C. Heating is continued over night (20 hours) after which the solids content is about 42%. There is then added 0.75 g. azobisisobutyronitrile, and heating is continued for five hours. Solids content is now about 45%, indicating a monomer conversion of about 86%.

This polymer is compatible with Uformite MX-61. They are blended in a 6:4 (solids) ratio, and coated on a steel panel, which is then allowed to dry and baked 30 minutes at 177° C. The baked film is well-cured and flexible. This polymer is also compatible with Resimene-875. Blended at 6:4 (solids) ratio, flowed on steel panels and baked 30 minutes at 177° C., a well-cured, very brittle film is produced.

At a 7:3 ratio, the film is still brittle. At an 8:2 ratio, the film possesses flexibility, yet is well cured and hard.

*Example 6*

A solution of 51.8 g. ethyl acrylate, 66.2 g. butyl acrylate, 7.5 g. methacrylic acid, 7.5 g. acrylonitrile, and 3.0 g. azobisisobutyronitrile in 75 g. xylene is added over a three hour period to 32 g. of 2-hydroxymethyl-5-norbornene in 75 g. xylene, heated to 90° C. Heating is continued overnight. Solids content at 20 hours is found to be 44%. An additional 0.75 g. azobisisobutyronitrile is added and heating at 90° C. is continued for another five hours, which increases the solids content to about 47%, indicating a monomer conversion of about 89%.

This resin solution is compatible with Uformite MX-61 when blended at a 6:4 (solids) ratio. Films baked 30 minutes at 177° C. are well cured, hard, and flexible.

Films prepared from a 6:4 (solids) ratio blend of this resin with Resimene-875 are well cured but brittle. At an 8:2 ratio, the films are well-cured, hard, and flexible.

*Example 7*

A solution of 116 g. butyl acrylate, 128 g. butyl methacrylate, 19 g. methacrylic acid, and 6.38 g. azobisisobutyronitrile in 160 g. xylene is added over 3 hours to 56 g. of 2-hydroxymethyl-5-norbornene in 159 g. xylene heated to 90° C. Heating is continued overnight, for a total of 21 hours; at this point, the solids content is found to be about 41%. A further 1.6 g. of azobisisobutyronitrile is added, and heating is continued for an additional 5 hours at 90° C., followed by ½ hour at 140° C. (This brief heating at 140° C. serves to destroy any remaining polymerization initiator.) The solids content is now about 43%, and the viscosity about F on the Gardner-Holdt scale.

This resin solution is blended at a 6:4 (solids) ratio with Uformite MX-61 (a triazine-formaldehyde resin). The blend is flowed over steel panels which are then baked ½ hour at 177° C. The resulting clear film is well-cured, compatible, flexible, tough, and shows unusually good solvent resistance and stain resistance.

*Example 8*

A solution of 216 g. butyl acrylate, 24 g. vinyl butyl ether, 21 g. methacrylic acid, and 6.42 g. azobisisobutyronitrile in 160 g. xylene is added over a three hour period to 60 g. 2-hydroxymethyl-5-norbornene in 160 g. xylene heated to 90° C. Heating is continued overnight for a total of 21 hours. The solids content is now about 42%. An additional 1.6 g. of azobisisobutyronitrile is added, and the solution is heated a further 5 hours at 90° C. and a final ½ hour at 140° C., the latter to destroy the last remaining catalyst. The solids content is now about 43% (indicating a monomer conversion of about 86%), and the viscosity is E on the Gardner-Holdt scale.

Like the copolymer resin of Example 7, this product is compatible with Uformite MX-61, and at a 6:4 solids ratio gives baked films which are clear, well-cured, flexible, tough, and possessed of excellent solvent resistance and stain resistance.

*Example 9*

A solution of 147 g. 2-ethylhexyl acrylate, 103 g. butyl acrylate, 17 g. methacrylic acid, and 6.34 g. azobisisobutyronitrile in 158 g. xylene is added over 3 hours to a solution of 50 g. 2-hydroxymethyl-5-norbornene in 158 g. xylene heated to 90° C. Heating is continued overnight for a total of 21 hours. The solids content is about 50%. A further 1.6 g. azobisisobutyronitrile is added and the mixture is heated for another 5 hours at 90° C., with a final half hour at 140° C. The solids content is now about 53%, indicating a probable solvent loss. The viscosity is M on the Gardner-Holdt scale, or 3.2 poises.

This resin is blended in a 6:4 (solids) ratio with Uformite MX-61 (a triazine-formaldehyde resin). The blend is flowed over steel panels, which are then baked for ½ hour at 177° C. The resulting films are well-cured, compatible, clear, flexible, tough, adhere well to the metal, and have excellent solvent resistance and stain resistance.

*Example 10*

Into a 20 gallon jacketed kettle equipped with a stirrer and a reflux condenser and fitted for both steam heating and water cooling, are charged 19.80 lbs. xylene and 7.13 lbs. 2-hydroxymethyl-5-norbornene. The stirrer is started, and the kettle contents are heated under a nitrogen blanket to 90° C. A solution of 29.00 lbs. butyl acrylate, 1.72 lbs. methacrylic acid, 1.72 lbs. acrylonitrile, and 0.79 lb. benzoyl peroxide in 19.80 lbs. xylene is added slowly over a three hour period, maintaining the temperature of the kettle contents at 90° C. (Intermittent cooling may be necessary.) Two hours after completion of this monomer addition, another 0.20 lb. of benzoyl peroxide is added and stirring is continued at 90° C. for another 2 hours, at which point another 0.20 lb. of benzoyl peroxide is added. After a further two hours at 90° C., the temperature is raised to 120° C. for one hour. The solids content of the solution is found to be about 44.4%, indicating a monomer conversion of about 89%.

This copolymer solution is blended in a 6:4 (solids) ratio with Uformite MX-61 (a commercial triazine-formaldehyde resin). The resulting blend is used to coat steel panels which are baked one half hour at 177° C. The resulting film is well-cured, clear, hard, adherent, very flexible, and has good solvent resistance and stain resistance.

A white enamel is formulated from the above 6:4 blend by adding enough titanium oxide pigment to give a solids composition of 40% $TiO_2$, 36% copolymer resin, and 24% melamine-formaldehyde resin. This enamel is sprayed on primed steel panels which are baked for ½ hour at 177° C. The resulting films are of good color, flexible, glossy, hard, and resistant to staining by lipstick, mustard, and sodium hypochlorite solution. Panels baked at 204° C. for 1 hour and even for two hours are only slightly yellowed, have good gloss and flexibility, and are similarly resistant to staining. The baked films from this enamel show unusual resistance to attack by soap and household detergents.

*Example 11*

The kettle used in Example 11 is charged with 21.00 lbs. of xylene and 7.38 lbs. of 2-hydroxymethyl-5-norbornene. The stirrer is started, and the kettle contents are heated to 90° C. under a nitrogen blanket. A solution of 15.32 lbs. butyl acrylate, 16.88 lbs. butyl methacrylate, 2.50 lbs. methacrylic acid, and 0.84 lb. azobisisobutyronitrile in 21.00 lbs. xylene is then added slowly over a three-hour period, keeping the reaction mixture at 90° C. The reaction is mildly exothermic, and a little cooling may be needed. Two hours after completion of monomer addition, an 0.21 lb. portion of azobisisobutyronitrile is added, and the mixture is stirred at 90° C. for 2 hours; a second 0.21 lb. portion of azobisisobutyronitrile is added and after two hours more (total of nine hours at 90° C.), the temperature is raised to 120° C. for one hour, after which the product is cooled to room temperature. Solids content is 44%, indicating an 88% conversion of monomers. The viscosity is H on the Gardner-Holdt scale, or 2.0 poises.

This resin can be blended with pigments and aminoplast resins to yield excellent baking enamels.

*Example 12*

The kettle used in Examples 11 and 12 is charged with 24.60 lbs. of xylene and 8.87 lbs. of 2-hydroxymethyl-5-norbornene. This is stirred and heated to 90° C. under nitrogen. A solution of 36.10 lbs. of butyl acrylate, 2.14 lbs. methyl methacrylate, 2.14 lbs. methacrylic acid, and 0.985 lb. benzoyl peroxide in 24.60 lbs. xylene is then added over a three-hour period while keeping the reaction mixture at 90° C. Heating at 90° C. is continued for a total of nine hours; at the 5th and 7th hours, 0.249 lb. portions of benzoyl peroxide are added. After the nine hours at 90° C., the mixture is heated to 120° C. for 1 hour, and then cooled to room temperature. Solids content is 46%, indicating a monomer conversion of 92%. Viscosity is H on the Gardner-Holdt scale, or 2.0 poises.

This copolymer resin, when blended with melamine-formaldehyde resins, gives excellent heat-curing finishes suitable for furniture and household appliances such as mixers, washing machines, air-conditioners, etc.

*Example 13*

Into the kettle used in Examples 11, 12, and 13 is charged 19.35 lbs. xylene and 7.13 lbs. 2-hydroxymethyl-5-norbornene. Stirring is started, and the mixture is heated under a nitrogen blanket to 90° C. A solution of 29.00 lbs. butyl acrylate, 1.72 lbs. methacrylic acid, 0.86 lbs. acrylonitrile, and 0.79 lb. azobisisobutyronitrile in 19.35 lbs. xylene is then added over a three-hour period, maintaining the temperature at 90° C. by flowing cold water thru the kettle jacket when necessary. Heating is continued for a total of nine hours at 90° C. At the fifth and seventh hours, 0.20 lb. portions of azobisisobutyronitrile are added. At the end of the ninth hour, the temperature is raised to 120° C. for one hour, after which the product is cooled to room temperature. The solids content is 46%, indicating a monomer conversion of about 92%.

*Example 14*

A solution of 115 g. butyl acrylate and 3 g. benzoyl peroxide in 75 g. xylene is added slowly over 1.5 hours to a solution 35 g. 2,2-bis-(hydroxymethyl)-5-norbornene in 75 g. xylene. During the addition and for a subsequent three-hour reaction period, the temperature is held at 90° C. A catalyst addition of 0.75 g. benzoyl peroxide is made 1.5 hours after completion of the monomer addition. After a total reaction time of 4.5 hours at 90° C., the temperature is raised to 125° C. for one hour. Final conversion of monomers to copolymer is about 92%.

The resin solution is blended with Uformite MX-61 in a 6:4 (solids) weight ratio, drawn down on steel panels and baked at 177° C. for three hours to yield a well-cured coating resistant to staining and solvent attack.

The 2,2-bis-(hydroxymethyl)-5-norbornene used in this example is conveniently prepared in two steps, as follows: (1) a Diels-Alder reaction between acrolein and cyclopentadiene produces 5-norbornene-2-carboxaldehyde; (2) treatment of this aldehyde with an excess of formaldehyde in the presence of sodium hydroxide causes an aldolization reaction followed by a cross-Cannizzaro reaction to occur, resulting in the formation of the desired 2,2-bis-(hydroxymethyl)-5-norbornene.

*Example 15.—White baking enamel*

A solution of 148 g. 2-ethylhexyl acrylate, 52 g. butyl acrylate, 40 g. methyl methacrylate, 9 g. methacrylic acid and 6 g. benzoyl peroxide in 149 g. xylene is added slowly over a three-hour period to a solution of 50 g. 2-hydroxymethyl-5-norbornene in 150 g. xylene. During the addition and for a subsequent 9 hours reaction period, the temperature is maintained at 90° C. Additional 1.5 gram portions of catalyst are added five and seven hours, respectively, after completing the addition of the reactants; nine hours after addition of the reactants, the temperature is raised to 125° C. for one hour to decompose residual catalyst. Analysis shows 46.3% solids, indicating a 92.6% conversion of monomers.

An enamel is formulated by combining 40 parts of $TiO_2$ pigment, 78 parts of the above resin solution, and 40 parts of Uformite MX-61 (60% solids solution). This enamel is sprayed onto primed steel panels and baked at 350° F. for 30 minutes. The resulting enamel coating is of excellent color, shows good color stability to ultraviolet exposure, has good gloss, and is very resistant to soaps and detergents. Even if over-baked for one hour at 400° F., the color is still acceptable as an appliance white.

*Example 16.—Black baking enamel*

A solution of 460 g. methyl methacrylate, 90 g. methacrylic acid, and 14.6 g. azobisisobutyronitrile in 364 g. toluene is added over a three-hour period to a solution of 178 g. 2-hydroxymethyl-5-norbornene in 364 g. toluene. Temperature during the addition of reactants and for a subsequent seven-hour period is kept at 90° C. The solids content is found to be 45.6%, indicating a conversion of 91.2%.

A black baking enamel is prepared by dispersing four parts of carbon black in 100 parts of the above resin solution. Films 0.005" thick of this enamel are drawn down on steel plates, dried 15 minutes at 110° F. and baked for 30 minutes at 180° or 250° F. The resulting coatings are adherent, tough, glossy, and somewhat brittle.

*Example 17.—High-heat white ink*

A solution of 244 g. 2-ethylhexyl acrylate, 15 g. methacrylic acid, and 6 g. azobisisobutyronitrile in 150 g. xylene is added slowly over a three-hour period to a solution of 41 g. 2-hydroxymethyl-5-norbornene in 150 g. xylene. During the addition of the reactants and a subsequent 26 hour reaction period the temperature is maintained at 90° C. After 21 hours of reaction time, a further addition of 1.5 grams of azobisisobutyronitrile catalyst is made. Five hours later, the temperature is raised to 135–140° C. for ½ hour to decompose residual catalyst. A solids determination shows a content of 45.4%, indicating a conversion of 90.8%.

A high-heat white ink is prepared by combining 30 parts of titanium dioxide pigment with 45 parts of the above resin solution and about 17 parts of Uformite MX-61 (60% solids). This ink is rolled out on 0.004" aluminum foil and baked at 450° F. for five seconds.

The resulting film is tough, non-blocking, adherent, and of good initial color and color stability.

Example 18.—Heat-cured wood finish

A solution of 221 g. butyl acrylate, 13 g. methyl methacrylate, 13 g. methacrylic acid, and 6 g. benzoyl peroxide in 150 g. xylene is added slowly over a three hour period to a solution of 54 g. 2-hydroxymethyl-5-norbornene in 150 g. xylene. During the addition and for a subsequent nine-hour reaction period, the temperature is held at 90° C. At the fifth and seventh hours, 1.5 gram portions of benzoyl peroxide catalyst are added. After nine hours of reaction at 90° C. the mixture is heated to 120° C. for one hour to decompose residual catalyst. The solution contains 46.3% solids, indicating a 92.6% conversion of monomers to copolymer resin.

A wood finish is formulated by combining 72 parts of the above resin solution with 55 parts of Resimene U-920 (a 60% solids solution of a urea-formaldehyde resin in a xylene-butanol solvent), and one part of p-toluene sulfonic acid. This blend is sprayed onto wood panels and baked at 120° F. for one hour. The resulting film is well-cured, hard, and brittle, with good stain resistance, and is suitable for furniture and similar services.

Example 19

A solution of 132 g. butyl acrylate and 3 g. azobisisobutyronitrile in 75 g. xylene is added dropwise over three hours to a solution of 18 g. x-methyl-2-hydroxymethyl-5-norbornene (prepared by addition of allyl alcohol to methylcyclopentadiene) in 75 g. xylene maintained at 90° C. After 10 hours a 91% conversion of monomers has occurred. Heating is continued for a total of 21 hours; at the tenth and fifteenth hours, 0.75 g. portions of azobisisobutyronitrile are added. Final conversion is about 97%.

This resin is blended at a 6:4 (solids) ratio with Uformite MX-61 to give a lacquer which, when coated on steel panels and baked 30 minutes at 177° C., yields well-cured films of good flexibility.

Example 20

A solution of 118 g. butyl acrylate, 3.0 g. methacrylic acid, and 3.1 g. azobisobutyronitrile in 77 g. xylene is added slowly over three hours to a solution of 32 g. x-methyl-2-hydroxymethyl-5-norbornene (prepared by Diels-Alder addition of allyl alcohol to methylcyclopentadiene) in 76 g. xylene, maintaining the reaction mixture at 90° C. After 10 hours at 90° C., a 75% conversion of monomers to polymers is obtained. A 0.76 g. portion of azo catalyst is added and heating is continued another 5 hours. Final conversion of monomers to polymer is about 83%.

This copolymer is blended at a 6:4 (solids) ratio with Uformite MX-61 to give a lacquer which, when coated on steel panels and baked 30 minutes at 177° C., gives well-cured films which are hard, flexible, scratch-resistant, and resistant to staining and to attack by organic solvents.

Example 21

A solution of 217 g. butyl acrylate, 13 g. methyl methacrylate, 12 g. methacrylic acid, and 6 g. benzoyl peroxide in 150 g. xylene is added slowly over three hours to a solution of 58 g. x-methyl-2-hydroxymethyl-5-norbornene (prepared by Diels-Alder addition of allyl alcohol to methylcyclopentadiene) in 150 g. xylene while maintaining the temperature at 90° C. Heating is continued for another six hours, with two 1.5 g. portions of catalyst being added at two-hour intervals from time of completion of the monomer addition. Total conversion of monomers to polymer is about 90%.

This copolymer may be blended with Uformite MX-61 as described in Example 20. Baked films of the resulting lacquer are hard, flexible, and resistant to scratches and stains.

Example 22

A solution of 83 g. butyl acrylate and 2.16 g. benzoyl peroxide in 54 g. xylene is added slowly over three hours to a solution of 25 g. 2,3-bis-(hydroxymethyl)-5-norbornene (prepared by Diels-Alder addition of cyclopentadiene to 1,4-butenediol) in 54 g. of xylene while maintaining the temperature at 100° C. After 10 hours, the conversion is about 88%. Addition of 0.54 g. benzoyl peroxide and continuation of heating for an additional 5 hours increases the conversion to about 91%.

Blended with melamine-formaldehyde resin, coated on steel, and baked, this copolymer forms films of good flexibility and fair hardness and stain resistance.

Example 23

A solution of 101 g. 2-ethylhexyl acrylate, 26 g. acrylamide, and 3 g. benzoyl peroxide in 72 g. ethanol is added slowly over a three hour period to a refluxing solution of 23 g. 2-hydroxymethyl-5-norbornene in 75 g. ethanol. Refluxing is continued throughout a 10-hour reaction period, with a 0.75 g. portion of catalyst being added three hours after completion of monomer addition. Conversion of monomers indicated by determination of solids content, is about 98%.

This resin solution is blended with a triazine-formaldehyde resin (Uformite MX-61) in a 6:4 weight ratio on a solids basis, drawn down on a steel panel and baked at 177° C. for 30 minutes to yield a cured solvent-resistant film which is glossy, transparent, and adheres well to the steel panel.

Example 24

A solution of 70 g. methyl methacrylate, 130 g. butyl acrylate, 38 g. dimethyl maleate, and 5.8 g. benzoyl peroxide in 144 g. benzene is added dropwise over 4 hours to a refluxing solution of 12 g. of glycerol-alpha-allyl ether and 38 g. 2-hydroxymethyl-5-norbornene in 144 g. benzene. Refluxing is continued for 24 hours after completion of the monomer addition, with a 2.9 g. portion of benzoyl peroxide being added at the end of 18 hours. Final conversion is found to be about 92%.

Blending this resin with a triazine-formaldehyde resin results in heat-curable surface coatings characterized by good gloss, flexibility, and hardness.

Example 25

A solution of 73.4 parts butyl acrylate, 4.3 parts methyl methacrylate, 4.3 parts methacrylic acid, and 2.0 parts tertiary butyl perbenzoate in 21.7 parts xylene is added over a three-hour period to a solution of 18 parts 2-hydroxymethyl-5-norbornene in 21.7 parts xylene maintained at 125° C. Heating is continued for a total of 10 hours at 125° C. At the fifth and seventh hours, additional 0.5 part increments of tertiary butyl perbenzoate are added. The solids content is now about 68%, indicating a monomer conversion of about 97%. The viscosity of the resin solution is Z5 on the Gardner-Holdt scale. Baked films prepared from a blend of this resin with a triazine-formaldehyde resin are well cured, clear, and hard, with good flexibility and fair resistance to staining.

Example 26

A solution of 73.3 parts butyl acrylate, 4.3 parts methyl methacrylate, 4.3 parts methacrylic acid, and 3.0 parts benzoyl peroxide in 27 parts butanol is added over a 3-hour period to a solution of 18 parts 2-hydroxymethyl-5-norbornene in 27 parts butanol maintained at 90° C. Heating is continued at 90° C. for a total reaction time of 9 hours, with 0.5 part increments of benzoyl peroxide being added at the end of 7½ hours. At the end of 9 hours, the temperature is raised to 125° C. for ½ hours to destroy residual catalyst. The solids content is about 62%, indicating a monomer conversion of about 95%. The resin solution has a viscosity of Z on the Gardner-Holdt scale. Baked films prepared from a 6:4 (solids basis) blend of this resin with a triazine-formaldehyde resin are well cured, hard, flexible, and stain resistant.

*Example 27*

A solution of 330 g. butyl acrylate, 90 g. vinyl toluene, 42 g. methyl methacrylate, 30 g. methacrylic acid, 12 g. tertiary-butyl perbonzoate and 300 g. xylene is added over a period of 90 minutes to a solution of 108 g. 2-hydroxymethyl-5-norbornene and 300 g. xylene heated to 125° C. Ninety minutes after monomer addition is completed 3 g. tertiary-butyl perbenzoate is added and reaction is continued at 125° C. for an additional 2.5 hours. After a total of 5.5 hours at 125° C. the resulting copolymer solution has a viscosity of E on the Gardner-Holdt scale. A solids determination indicates a 42.2% total non-volatile content or 84.4% conversion.

Combining the solution copolymer with an amine resin (Uformite MX–61) at a 6:4 weight ratio and baking the resulting clear blend on a steel panel at 177° C. for 30 minutes yields cured coating, hard and glossy with good solvent resistance.

*Example 28*

A solution of 165 g. butyl acrylate, 45 g. styrene, 21 g. methyl methacrylate, 15 g. methacrylic acid, 6 g. benzoyl peroxide and 150 g. xylene is added over a period of 90 minutes to a solution of 54 g. 2-hydroxymethyl-5-norbornene and 150 g. xylene heated to 90° C. Ninety minutes after monomer addition is completed 1.5 g. benzoyl peroxide is added and reaction is continued at 125° C. for an additional 1.5 hours. After a total of 4.5 hours at 90° C. the resulting copolymer solution has viscosity of E½ on the Gardner-Holdt scale. A solids determination indicates a 40.1% total non-volatile content or 80.2% conversion. After heating one additional hour at 125° C. the copolymer solution has a viscosity of R and a solids content of 41.8% or an 83.6% conversion.

Combining the solution copolymer with an amine resin (Uformite MX–61) at a 6:4 weight ratio and baking the resulting clear blend on a steel panel at 177° C. for 30 minutes yields a cured coating, hard and glossy with good solvent resistance.

*Example 29*

A solution of 216 g. butyl acrylate, 15 g. vinyl acetate, 15 g. methacrylic acid, 6 g. benzoyl peroxide and 150 g. xylene is added over a period of 90 minutes to a solution of 54 g. 2-hydroxymethyl-5-norbornene and 150 g. xylene heated to 90° C. Ninety minutes after monomer addition is completed 1.5 g. benzoyl peroxide is added and reaction is continued at 90° C. for an additional 1.5 hours. After a total of 4.5 hours at 90° C. the resulting copolymer solution has a viscosity of D on the Gardner-Holdt scale. A solids determination indicates a 43.6% total non-volatile or 87.2% conversion. After heating one additional hour at 125° C. the copolymer solution has a viscosity of D½ and a solids content of 44.4% or an 88.8% conversion.

Combining the solution copolymer with an amine resin (Uformite MX–61) at a 6:4 weight ratio and baking the resulting clear blend on a steel panel at 177° C. for 30 minutes yields a cured coating, hard and glossy with good solvent resistance.

What is claimed is:

1. An organic-solvent soluble interpolymer made by free-radical initiated copolymerization of a mixture of monomers comprising (1) from about 5% to about 30% by weight of a non-allylic alcohol containing the norbornene nucleus, and (2) from about 50% to about 95% by weight of olefinically unsaturated ester material having the formula:

$$H_2C=\underset{\underset{R}{|}}{C}-CO_2R'$$

in which R is a member of the group consisting of hydrogen and methyl, and R' is an alkyl radical containing from 1 to 8 carbon atoms, and (3) from 0 to 35% by weight of monomers from the group consisting of methacrylic acid, acrylonitrile, acrylamide, styrene, vinyl acetate, vinyl toluene, vinyl butyl ether, glycerol-α-allyl ether, and dimethyl maleate.

2. An interpolymer according to claim 1, being the copolymerization product of a mixture of monomers comprising 2-hydroxymethyl-5-norbornene, butyl acrylate, methyl methacrylate, and methacrylic acid.

3. An interpolymer according to claim 1, being the copolymerization product of a mixture of monomers comprising 2-hydroxymethyl-5-norbornene, butyl acrylate, methyl methacrylate, acrylonitrile, and methacrylic acid.

4. An interpolymer according to claim 1, being the copolymerization product of a mixture of monomers comprising 2-hydroxymethyl-5-norbornene, methyl methacrylate, and methacrylic acid.

5. An interpolymer according to claim 1, being the copolymerization product of a mixture of monomers comprising 2-hydroxymethyl-5-norbornene, 2-ethylhexyl acrylate, butyl acrylate, methyl methacrylate, and methacrylic acid.

6. A surface coating composition comprising a volatile organic solvent solution of an interpolymer as defined in claim 1.

7. A surface coating composition comprising a volatile organic solvent solution of an interpolymer as defined in claim 4.

8. A surface coating composition comprising a pigmented volatile organic solvent solution of an interpolymer as defined in claim 1.

9. A surface coating composition comprising a pigmented volatile organic solvent solution of an interpolymer as defined in claim 4.

10. A heat-curable surface coating composition comprising a volatile organic solvent solution of an interpolymer as defined in claim 1 and an organic solvent soluble amine-aldehyde resin of the class consisting of triazine-formaldehyde resins and urea-formaldehyde resins.

11. A heat-curable surface coating composition comprising a volatile organic solvent solution of an interpolymer as defined in claim 2 and an organic solvent soluble amine-aldehyde resin of the class consisting of triazine-formaldehyde resins and urea-formaldehyde resins.

12. A heat-curable surface coating composition comprising a volatile organic solvent solution of an interpolymer as defined in claim 3 and an organic solvent soluble amine-aldehyde resin of the class consisting of triazine-formaldehyde resins and urea-formaldehyde resins.

13. A heat-curable surface coating composition comprising a volatile organic solvent solution of interpolymer as defined in claim 4 and an organic solvent soluble amine-aldehyde resin of the class consisting of triazine-formaldehyde resins and urea-formaldehyde resins.

14. A heat-curable surface coating composition comprising a volatile organic solvent solution of an interpolymer as defined in claim 5 and an organic solvent soluble amine aldehyde resin of the class consisting of triazine-formaldehyde resins and urea-formaldehyde resins.

15. A heat-curable surface coating composition comprising a pigment dispersed in a volatile organic solvent solution of an interpolymer as defined in claim 1 and an amine-aldehyde resin of the group consisting of triazine-formaldehyde resins and urea-formaldehyde resins.

16. A heat-curable surface coating composition comprising a pigment dispersed in a volatile organic solvent solution of an interpolymer as defined in claim 2 and an amine-aldehyde resin of the group consisting of triazine-formaldehyde resins and urea-formaldehyde resins.

17. A heat-curable surface coating composition comprising a pigment dispersed in a volatile organic solvent solution of an interpolymer as defined in claim 3 and an amine-aldehyde resin of the group consisting of triazine-formaldehyde resins and urea-formaldehyde resins.

18. A heat-curable surface coating composition comprising a pigment dispersed in a volatile organic solution of an interpolymer as defined in claim 4 and an amine-aldehyde resin of the group consisting of triazine-formaldehyde resins and urea-formaldehyde resins.

19. A heat-curable surface coating composition comprising a pigment dispersed in a volatile organic solvent solution of an interpolymer as defined in claim 5 and an amine-aldehyde resin of the group consisting of triazine-formaldehyde resins and urea-formaldehyde resins.

References Cited in the file of this patent

UNITED STATES PATENTS

| | | |
|---|---|---|
| 2,596,279 | Nichols et al. | May 13, 1952 |
| 2,853,462 | Gaylord | Sept. 23, 1958 |